US010223371B2

(12) United States Patent
Thirumal

(10) Patent No.: US 10,223,371 B2
(45) Date of Patent: Mar. 5, 2019

(54) HOST-BASED DEDUPLICATION USING ARRAY GENERATED DATA TAGS

(71) Applicant: VMWARE, INC., Palo Alto, CA (US)

(72) Inventor: Thiruvengada Govindan Thirumal, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 415 days.

(21) Appl. No.: 14/616,759

(22) Filed: Feb. 9, 2015

(65) Prior Publication Data

US 2016/0147785 A1 May 26, 2016

(30) Foreign Application Priority Data

Nov. 21, 2014 (IN) .......................... 5856/CHE/2014

(51) Int. Cl.
*G06F 17/00* (2006.01)
*G06F 17/30* (2006.01)
*G06F 3/06* (2006.01)
*G06F 12/0891* (2016.01)
*G06F 9/455* (2018.01)

(52) U.S. Cl.
CPC ........ *G06F 17/30156* (2013.01); *G06F 3/067* (2013.01); *G06F 3/0608* (2013.01); *G06F 3/0641* (2013.01); *G06F 12/0891* (2013.01); *G06F 17/30097* (2013.01); *G06F 9/45533* (2013.01); *G06F 9/45558* (2013.01); *G06F 2009/45579* (2013.01); *G06F 2212/152* (2013.01); *G06F 2212/154* (2013.01); *G06F 2212/608* (2013.01)

(58) Field of Classification Search
CPC ......... G06F 17/30156; G06F 2212/152; G06F 3/0641; G06F 3/067; G06F 9/45533
See application file for complete search history.

(56) References Cited

U.S. PATENT DOCUMENTS 6,269,431 B1 * 7/2001 Dunham ............. G06F 11/1469 707/999.202
8,190,823 B2 * 5/2012 Waltermann ........ G06F 12/0868 711/113

* cited by examiner

*Primary Examiner* — Cheryl Lewis
(74) *Attorney, Agent, or Firm* — Fish & Richardson P.C.

(57) ABSTRACT

Exemplary methods, apparatuses, and systems include a host computer detecting a request to utilize data stored at a storage address in an external storage device. The host computer, in response to the detected request, transmits a request to the storage device for a tag that uniquely identifies the data. The tag for the data is received from the storage device. In response to determining that the received tag matches a local mapping of tags stored in the host computer, the host computer utilizes the local mapping of tags to process the detected request.

20 Claims, 3 Drawing Sheets

HOST-BASED DEDUPLICATION USING ARRAY GENERATED DATA TAGS

RELATED APPLICATIONS

Benefit is claimed under 35 U.S.C. 119(a)-(d) to Foreign application Serial No. 5856/CHE/2014 filed in India entitled "HOST-BASED DEDUPLICATION USING ARRAY GENERATED DATA TAGS", on Nov. 21, 2014, by VMware, Inc., which is herein incorporated in its entirety by reference for all purposes.

FIELD OF THE INVENTION

The various embodiments described herein relate to data deduplication. In particular, embodiments include a computer leveraging data tags generated by an external storage device to deduplicate data requests.

BACKGROUND OF THE INVENTION

Data deduplication is often used to identify and eliminate duplicate copies of repeating data. As a result, data deduplication is used to improve storage utilization, to reduce the amount of data transferred over a network connection, etc. For example, a file system may periodically generate hashes of new files and determine if any matches exist for the new file hashes. When a new file hash matches a hash for an older file, the new file data is removed and replaced with a pointer to the older file.

A host computer attached to an external storage array may also utilize deduplication to reduce read requests transmitted to the storage array. For example, the host may generate and maintain a manifest of hashes for each block of data the storage array stores in one or more virtual machine disks for a virtual machine running on the host. If the host detects a read request from the virtual machine, the host retrieves the corresponding hashes, for the blocks being requested, from the manifest. The retrieved hashes are compared to hashes mapped to data within the host's cache. If the retrieved hashes matches hashes mapped to cached data, the host returns the cached data to the virtual machine in response to the read request (rather than reading the data from the storage array).

The generation and maintenance of such a manifest, however, places a large demand on the host's time and processing resources and requires a large amount of data transfer from the storage array to the host. For example, the host computer reads each virtual disk stored on the storage array to generate hashes for the manifests. Hashes need to be regenerated as the corresponding data changes over time. The generating and regenerating of hashes lead to downtime during which the corresponding virtual disk(s) are otherwise inaccessible. The manifest also occupies storage space that may be used for other purposes.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Embodiments described herein include a computer detecting a request to utilize data stored at a storage address in an external storage device. For example, the request may include or be mapped to a storage address and an offset value indicating a number of blocks or other portions of storage following the storage address that are subject to the request. The computer, in response to the request, transmits a request to the storage device for one or more tags that uniquely identify the requested data. The computer receives the tag(s) from the storage device. In response to determining the tag(s) match a local mapping of tags stored in the host computer, the computer utilizes the local mapping of tags to process the detected request. For example, the computer may map the data tag to a copy of the data stored in a cache within the computer and utilize the cached copy of the data rather than requesting the data from the external storage device. As a result, the computer is able to deduplicate data requests without the time, processing, and network costs involved with the computer generating and maintaining its own manifest of data tags. Also, the computer may choose to pre-fetch and cache data tags depending on access patterns of data requested. Such pre-fetch and caching of data tags prevent repeat requests to fetch these tags from the storage device. Additionally, the savings of the time, processing, and network resources increases as other computers share the external storage device and utilize the data tags generated by the storage device.

In one embodiment, the computer transmits a request to the external storage device (e.g., via a storage application programming interface (API)) to initiate the generation of data tags within the storage device. Additionally, the computer may request that the storage device regenerate data tags. For example, data tags may become stale as the corresponding data is deleted, changed, overwritten, etc.

Figure 1:
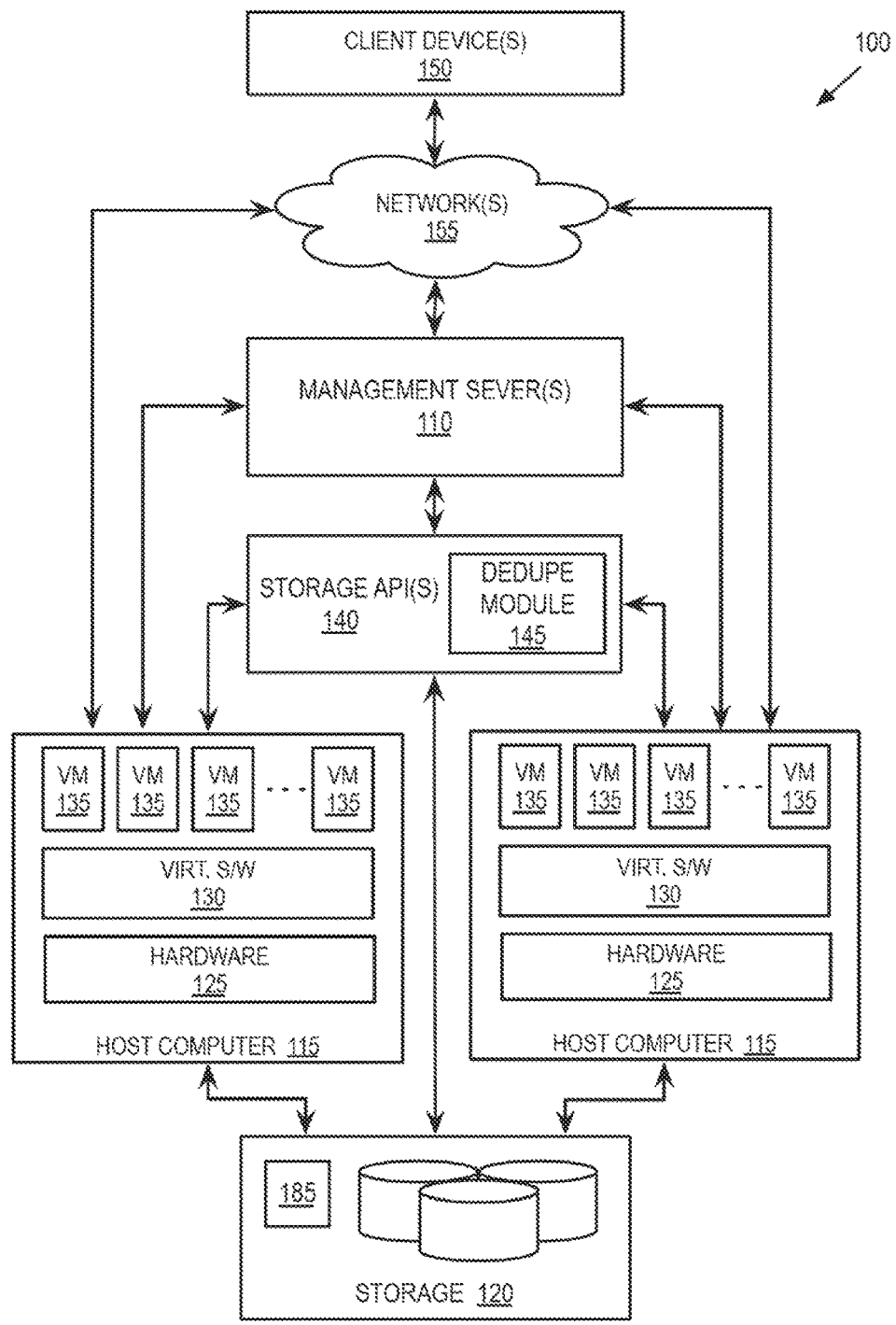
FIG. 1 illustrates, in block diagram form, an exemplary virtual data center environment including one or more networked processing devices implementing host-based deduplication using data tags generated by an external storage device.

FIG. 1 illustrates, in block diagram form, an exemplary virtual data center environment 100 including one or more networked processing devices implementing host-based deduplication using data tags generated by an external storage device. Data center environment 100 includes management server(s) 110, host computers 115, and external storage device(s) 120. Each host computer 115 includes hardware 125, virtualization software layer 130 (also referred to as a hypervisor), and virtual machines (VMs) 135.

VMs 135 are complete computation environments, containing virtual equivalents of the hardware and system software components of a physical system and are typically implemented by an extensive virtualization infrastructure, which includes a variety of software and hardware components. For example, one or more of VMs 135 may implement virtual desktops. A virtual desktop is a virtual computing system that operates as a desktop or workstation computer with which an end user can interact over network 155 (e.g., a local area network or other private or publically accessible wide area network, such as the Internet) using a desktop remoting protocol and the software and hardware of client device 150. In one embodiment, one or more of VMs 135 implement a virtualized compute, networking, storage, or security service (e.g., a firewall, webserver, database server, etc.).

Virtualization software layer 130 runs on hardware 125 of host computer 115 and manages one or more VMs 135. Virtualization software layer 130 manages physical resources, e.g., hardware 125, as well as maintains virtual-to-physical hardware mappings. For example, virtualization software 130 may manage VM access to a processor, memory, or network interface within hardware 125 as well as a virtual disk for each VM in underlying storage 120.

Storage 120 includes one or more physical storage devices. In one embodiment, storage 120 is a storage array and includes storage controller 185 to serve read and write requests and management commands/queries from host computers 115 and management servers 110, e.g., directly or via storage API(s) 140. Storage 120 is partitioned into logical units, volumes, virtual volumes, and/or disks (which are collectively referred to herein as logical storage devices) that are stored on one or more of the physical storage devices. Storage 120 may represent or otherwise include additional arrays, logical storage devices, or other partitions of storage.

Management server(s) 110 provide a management console for manual and automated control of hosts 115, VMs 135, and storage 120. For example, management server(s) 110 provision, configure, and maintain VMs 135 as virtual desktops or network services; manage pools of computer resources to run VMs 135, etc. Management server(s) 110 may further provide administrative access to define protection groups, recovery plans, a preferred recovery type, and other failover policies. In one embodiment, management server(s) 110 provide the implementation for unplanned failover, planned failover, and other data availability/recovery workflows and monitors host computers 115 for indications of an error with or failure of storage 120.

Data center environment 100 further includes one or more storage APIs 140. Storage APIs 140 enable host computers 115 and/or management server(s) 110 to gather information from storage 120 and utilize specific capabilities of storage 120. For example, management server(s) 110 may use storage APIs 140 to gather information around specific array features, such as snapshot, deduplication, replication state. RAID (redundant array of independent disks) levels, thin or thick provisioning, and status (health, troubleshooting, etc.).

In one embodiment, one or more storage APIs 140 run within or are otherwise a part of management server(s) 110. In another embodiment, one or more storage APIs 140 run within or are otherwise a part of host computer 115, e.g., as a part of or in addition to virtualization software 130. In another embodiment, one or more storage APIs 140 run within or are otherwise a part of storage 120, e.g., as a part of or in addition to storage controller 185. In yet another embodiment, one or more storage APIs 140 run within or are otherwise a part of a separate computing device.

Storage APIs 140 include deduplication module 145. Deduplication module 145 enables host computers 115 and/or management server(s) 110 to request storage 120 to generate data tags and regenerate data tags as described herein, e.g., with reference to FIG. 2. Additionally, deduplication module 145 enables host computers 115 and/or management server(s) 110 to query storage 120 for data tags generated for data stored in storage 120. In an alternate embodiment, host computers 115 and/or management server(s) 110 communicate directly with storage 120 (i.e., without storage API(s) 140 or deduplication module 145) to request the generation or regeneration of data tags or to query storage 120 for data tags.

Figure 2:
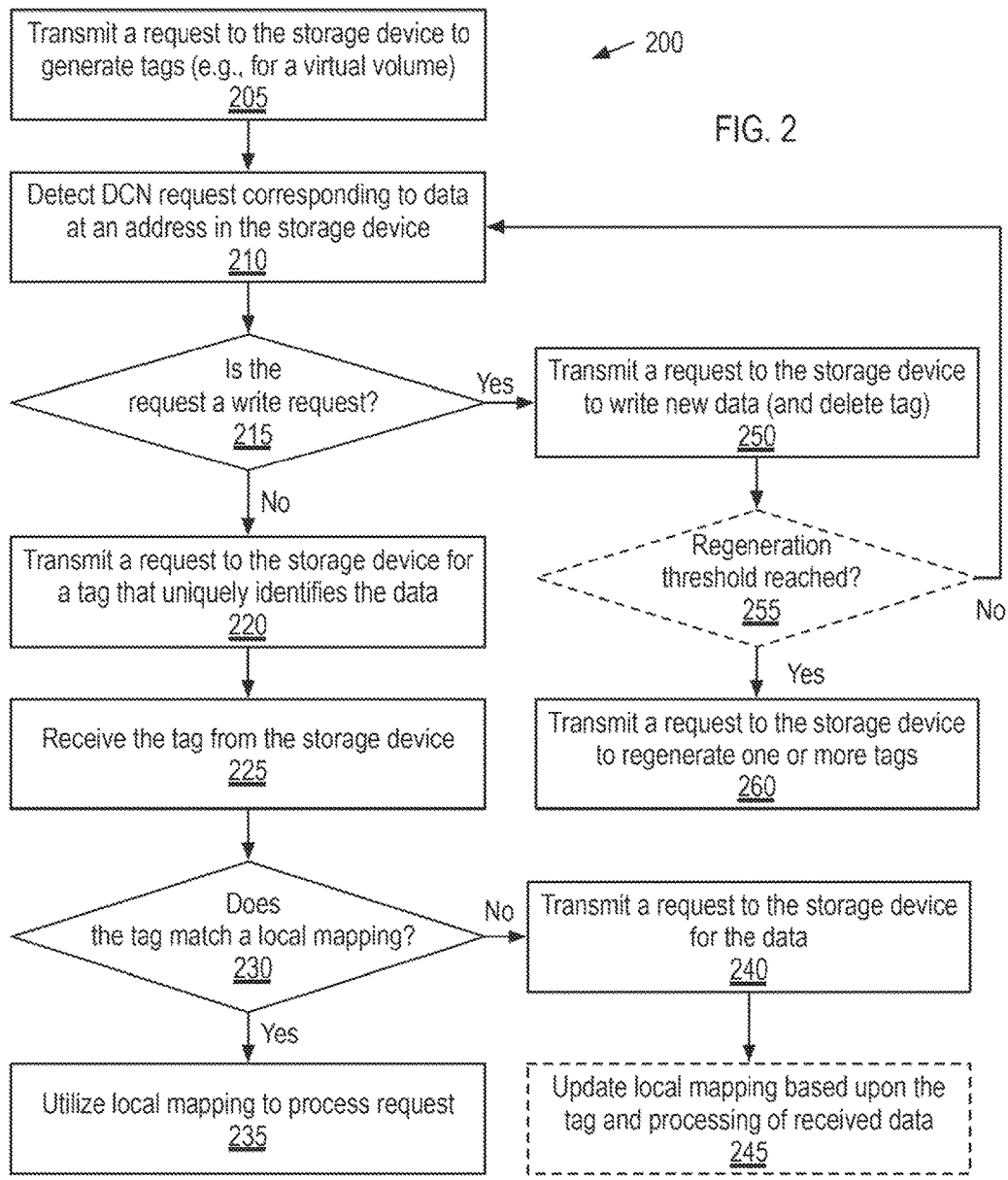
FIG. 2 is a flow chart illustrating an exemplary method of host-based deduplication of data requests using data tags generated by an external storage device.

FIG. 2 is a flow chart illustrating exemplary method 200 of host-based deduplication of data requests using data tags generated by an external storage device. At block 205, a computer transmits a request to an external storage device to generate data tags for data stored in the external storage device. For example, host computer 115 (directly or via management server 110) transmits a data tag generation request (directly or via deduplication module 145) to storage 120. In one embodiment, the request specifies a virtual disk, virtual volume, or other portion of storage 120 for which storage 120 is to generate data tags. In one embodiment, the request further specifies a granularity at which data tags are to be generated. For example, the request may define a data block size for which a single data tag is generated. In response to the request, storage 120 generates the data tags by creating unique signatures for the data. For example, storage 120 may utilize a hashing algorithm to generate hash values that serve as data tags, each of which uniquely identify the corresponding data. In an alternate embodiment, storage 120 automatically generates data tags, i.e., without a request from host computer 115 or from management server(s) 110. For example, storage 120 may generate data tags periodically or in response to data being written.

At block 210, the computer detects a request corresponding to data at an address in the external storage device. For example, host computer 115 detects a request from a VM 135 to read, write, copy, transfer, or otherwise utilize data in storage 120. In one embodiment, the request includes or is mapped to the address in storage 120 and an offset value, number of blocks, or other indication of the amount of data beginning at and following the address.

At block 215, the computer determines if the detected request is a write request. If the request is not a write request, at block 220, the computer transmits a request to the external storage device for one or more data tags that uniquely identify the data subject to the request. For example, host computer 115 transmits a query to storage 120 for the one or more data tags that identify the contiguous portion of data stored in storage 120.

At block 225, the computer receives the one or more requested tags from the external storage device. For example, storage 120 utilizes the storage address(es) that are a part of the identified contiguous portion data to look up the data tags. In one embodiment, the external storage device maintains an index or other mapping of storage addresses to data tags.

At block 230, the computer determines if the received data tag(s) map to data stored in another location or otherwise match a local mapping of data tags. For example, host computer 115 may maintain a cache in memory that is part of hardware 125. Additionally, host computer 115 may maintain an index of data tags that map to data stored in the cache. Once in receipt of the data tag(s) from storage 120, host computer 115 is able to search the index for matching data tags. Alternatively, host computer 115 may maintain another mapping of data tags to, e.g., data stored an alternate storage location, data transmitted over a network, replicated data, mirrored data, cloned data, etc.

If the received data tag(s) match a local mapping of data tags, at block 235, the computer utilizes the mapping to process the detected request. For example, if a received data tag matches a tag mapped to cached data, host computer 115 processes the request utilizing the cached copy of the data. As another example, if the received data tag matches a mapping (or list) of data tags that correspond to data that has previously been cloned, mirrored, replicated, transferred via a network, or otherwise processed, host computer 115 forgoes cloning, mirroring, replicating, transferring, or otherwise processing the data again. In one embodiment, when host computer 115 forgoes such a processing of the data, host computer 115 processes the request using a reference to the previous processing of the data. For example, host computer 115 may transmit a reference to a copy of the data previously transmitted to a client device 150 or another host computer 115 rather than retransmitting another copy of the data to the client device 150 or the host computer 115.

If the received data tag(s) do not match a local mapping of data tags, at block 240, the computer transmits a request to the external storage device for the data. For example, host computer 115 transmits a read request to storage 120 and receives the requested data in response.

At block 245, the computer optionally updates a local mapping of data tags based upon the data tag(s) and data received from the external storage device. For example, host computer 115 may add the data read from storage 120 to a cache in memory that is part of hardware 125 and index or otherwise map the data tag(s) to the new cache entry. Alternatively, host computer 115 may add the data tag(s) to a mapping or other list of data tags that were previously processed for the same type of request.

If the detected request is a write request, at block 250, the computer transmits a request to the external storage device to write or otherwise change the corresponding data. For example, host computer 115 transmits a write request including the new/changed data to storage 120. In one embodiment, write request includes a request to or otherwise causes the external storage device to delete the data tag stored in the external storage device and associated with the data being overwritten or changed. As a result, the data tag is disassociated from the updated portion of storage.

At block 255, the computer optionally determines if a regeneration threshold has been reached. For example, the regeneration threshold may indicate when the computer is to transmit a request to the external storage device to regenerate data tags. Exemplary regeneration thresholds may include one or more of: a number of write requests, an amount of data subject to write requests, and a period of time that has passed following a request to generate/regenerate data tags. For example, an administrator may select and define one or more of the thresholds for a host computer 115 via management server(s) 110. Alternatively, the one or more of the thresholds are set by default within host computer 115 or management server(s) 110.

At block 260, the computer transmits a request to the external storage device to regenerate the data tag(s). For example, host computer 115 (directly or via management server 110) transmits a data tag regeneration request (directly or via deduplication module 145) to storage 120. In one embodiment, the request specifies a virtual disk, virtual volume, or other portion of storage 120 for which storage 120 is to generate data tags. For example, the request may specific those portions of storage 120 that have been written or otherwise changed following the latest generation/regeneration of data tags. In an alternate embodiment, the write request includes the request to or otherwise causes the external storage device to regenerate the data tag(s) associated with the portion of storage being written.

Figure 3:
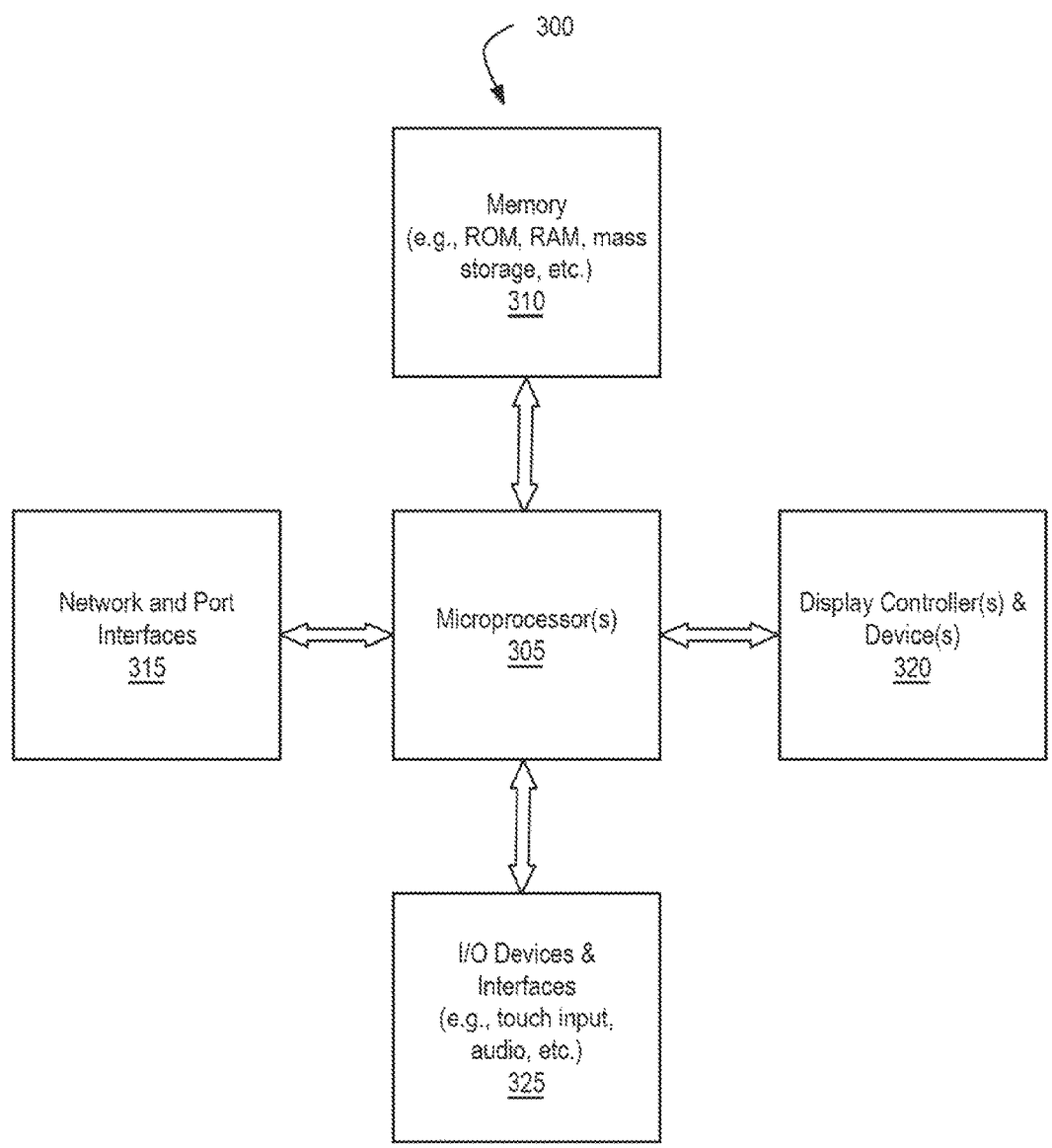
FIG. 3 illustrates, in block diagram form, an exemplary processing system to implement host-based deduplication using data tags generated by an external storage device.

FIG. 3 illustrates, in block diagram form, exemplary processing system 300 to implement host-based deduplication using data tags generated by an external storage device. Data processing system 300 includes one or more microprocessors 305 and connected system components (e.g., multiple connected chips). Alternatively, data processing system 300 is a system on a chip.

Data processing system 300 includes memory 310, which is coupled to microprocessor(s) 305. Memory 310 may be used for storing data, metadata, and programs for execution by the microprocessor(s) 305. Memory 310 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 310 may be internal or distributed memory.

Data processing system 300 includes network and port interfaces 315, such as a port, connector for a dock, or a connector for a USB interface, FireWire, Thunderbolt, Ethernet, Fibre Channel, etc. to connect the system 300 with another device, external component, or a network. Exemplary network and port interfaces 315 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect data processing system 300 with another device, external component, or a network and receive stored instructions, data, tokens, etc.

Data processing system 300 also includes display controller and display device 320 and one or more input or output ("I/O") devices and interfaces 325. Display controller and display device 320 provides a visual user interface for the user. I/O devices 325 allow a user to provide input to, receive output from, and otherwise transfer data to and from the system. I/O devices 325 may include a mouse, keypad or a keyboard, a touch panel or a multi-touch input panel, camera, optical scanner, audio input/output (e.g., microphone and/or a speaker), other known I/O devices or a combination of such I/O devices.

It will be appreciated that one or more buses, may be used to interconnect the various components shown in FIG. 3.

Data processing system 300 is an exemplary representation of one or more of client device(s) 150, management server(s) 110, host computer(s) 115, and storage device(s) 120 described above. Data processing system 300 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, data processing system 300 may be a network computer, server, or an embedded processing device within another device or consumer electronic product. As used herein, the terms computer, device, system, processing system, processing device, and "apparatus comprising a processing device" may be used interchangeably with data processing system 300 and include the above-listed exemplary embodiments.

It will be appreciated that additional components, not shown, may also be part of data processing system 300, and, in certain embodiments, fewer components than that shown in FIG. 3 may also be used in data processing system 300. It will be apparent from this description that aspects of the inventions may be embodied, at least in part, in software. That is, the computer-implemented method 200 may be carried out in a computer system or other data processing system 300 in response to its processor or processing system 305 executing sequences of instructions contained in a memory, such as memory 310 or other non-transitory machine-readable storage medium. The software may further be transmitted or received over a network (not shown) via network interface device 315. In various embodiments, hardwired circuitry may be used in combination with the software instructions to implement the present embodiments. Thus, the techniques are not limited to any specific combination of hardware circuitry and software, or to any particular source for the instructions executed by data processing system 300.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, VMs, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses distinct name spaces to isolate the containers from each other and therefore provides operating-system level segregation of the different groups of applications that operate within different containers. This segregation is akin to the VM segregation that is offered in hypervisor-virtualized environments, and thus can be viewed as a form of virtualization that isolates different groups of applications that operate in different containers. Such containers are more lightweight than VMs.

It should be recognized that while the specification refers to VMs, the examples given could be any type of DCNs, including physical hosts, VMs, non-VM containers, and hypervisor kernel network interface modules. In fact, the example networks could include combinations of different types of DCNs in some embodiments.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Additionally, as used herein, the term "exemplary" refers to embodiments that serve as simply an example or illustration. The use of exemplary should not be construed as an indication of preferred examples. Blocks with dashed borders (e.g., large dashes, small dashes, dot-dash, dots) are used herein to illustrate optional operations that add additional features to embodiments of the invention. However, such notation should not be taken to mean that these are the only options or optional operations, and/or that blocks with solid borders are not optional in certain embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. In a computing environment comprising, at least, a host computer communicatively coupled to a storage array comprising one or more external storage devices, a computer-implemented method for deduplicating data requests to the storage array, comprising:

detecting, by the host computer, a request to utilize data stored at a storage address in the storage array, wherein the request is received from a virtual machine;

transmitting by the host computer, in response to the detected request, a request to the storage array, wherein the request is a query for one or more tags that uniquely identifies the data stored at the storage address, and wherein each tag is generated by the storage array for units of stored data;

receiving by the host computer, from the storage array and in response to the request, the tag for the data stored at the storage address;

determining, by the host computer, that the received one or more tags match a local mapping of tags stored in the host computer by consulting an index that maps tags received by the host computer from the storage array to data stored in the host computer, wherein the matching tag indicates that the requested data is also stored in the host computer; and utilizing the data stored in the host computer that matches the one or more tags to process the request from the virtual machine instead of requesting the data from the storage address of the storage array identified by the request.

2. The computer-implemented method of claim 1, further comprising:
transmitting a request to the storage array to generate tags that uniquely identify data stored on the storage device.

3. The computer-implemented method of claim 1, further comprising:
detecting a request to write new data to the storage address; and
transmitting a request to the storage array to write the new data, wherein the tag is disassociated with the storage address in response to the request to write the new data.

4. The computer-implemented method of claim 3, further comprising:
transmitting a request to the storage array to regenerate one or more tags in response to the request to write the new data to the storage address.

5. The computer-implemented method of claim 3, wherein the request to regenerate the one or more tags is transmitted in response to determining the request to write the new data has exceeded a write request threshold.

6. The computer-implemented method of claim 1, wherein determining that the received tag matches a local mapping of tags stored in the host computer includes parsing a data structure for matching tags, the data structure mapping tags to data stored within host memory, and wherein utilizing the local mapping of tags to process the detected request includes utilizing the data stored within host memory to process the detected request.

7. The computer-implemented method of claim 1, wherein the detected request is generated by a data compute node and wherein the request is not a write request.

8. The method of claim 1, wherein each tag is generated by the storage array in response to a request from the host computer, and wherein each tag host computer request specifies a granularity for generating the data tag.

9. The method of claim 8, wherein generating each tag comprises creating unique signatures of the corresponding data.

10. A non-transitory computer-readable medium storing instructions, which when executed by a processing device in a computing environment comprising, at least, a host computer communicatively coupled to a storage array comprising one or more external storage devices, cause the processing device to perform a method comprising:
detecting, by the host computer, a request to utilize data stored at a storage address in the storage array, wherein the request is received from a virtual machine;
transmitting by the host computer, in response to the detected request, a request to the storage array, wherein the request is a query for one or more tags that uniquely identifies the data stored at the storage address, and wherein each tag is generated by the storage array for units of stored data;
receiving, from the storage array and in response to the request, the tag for the data stored at the storage address;
determining, by the host computer, that the received one or more tags match a local mapping of tags stored in the host computer by consulting an index that maps tags received by the host computer from the storage array to data stored in the host computer, wherein the matching tag indicates that the requested data is also stored in the host computer; and
utilizing the data stored in the host computer that matches the one or more tags to process the request from the virtual machine instead of requesting the data from the storage address of the storage array identified by the request.

11. The non-transitory computer-readable medium of claim 10, the method further comprising:
transmitting a request to the storage array to generate tags that uniquely identify data stored on the storage device.

12. The non-transitory computer-readable medium of claim 10, the method further comprising:
detecting a request to write new data to the storage address; and
transmitting a request to the storage array to write the new data, wherein the tag is disassociated with the storage address in response to the request to write the new data.

13. The non-transitory computer-readable medium of claim 12, the method further comprising:
transmitting a request to the storage array to regenerate one or more tags in response to the request to write the new data to the storage address.

14. The non-transitory computer-readable medium of claim 12, wherein the request to regenerate the one or more tags is transmitted in response to determining the request to write the new data has exceeded a write request threshold.

15. The non-transitory computer-readable medium of claim 10, wherein determining that the received tag matches a local mapping of tags stored in the host computer includes parsing a data structure for matching tags, the data structure mapping tags to data stored within host memory, and wherein utilizing the local mapping of tags to process the detected request includes utilizing the data stored within host memory to process the detected request.

16. The non-transitory computer-readable medium of claim 10, wherein the request is generated by a data compute node.

17. An apparatus communicatively pled to a storage array comprising one or more external storage devices comprising:
a processing device; and
a memory coupled to the processing device, the memory storing instructions which, when executed by the processing device, cause the apparatus to:
detect a request to utilize data stored at a storage address in the storage array, wherein the request is received from a virtual machine;
transmit in response to the detected request, a request to the storage array, wherein the request is a query for one or more tags that uniquely identifies the data stored at the storage address, and wherein each tag is generated by the storage array for units of stored data;
receive, from the storage array and in response to the request, the tag for the data stored at the storage address;
determine that the received one or more tags match a local mapping of tags by consulting an index that maps tags received by the apparatus from the storage array to data stored in the host computer, wherein the matching tag indicates that the requested data is also stored in the host computer; and
utilize the data stored in the host computer that matches the one or more tags to process the request from the virtual machine instead of requesting the data from the storage address of the storage array identified by the request.

18. The apparatus of claim 17, wherein the instructions further cause the apparatus to:

transmitting a request to the storage array to generate tags that uniquely identify data stored on the storage device.

19. The apparatus of claim 17, wherein the instructions further cause the apparatus to:
   detecting a request to write new data to the storage address; and
   transmitting a request to the storage array to write the new data, wherein the tag is disassociated with the storage address in response to the request to write the new data.

20. The apparatus of claim 19, wherein the instructions further cause the apparatus to:
   transmitting a request to the storage dev array ice to regenerate one or more tags in response to the request to write the new data to the storage address.

* * * * *